Patented Mar. 8, 1938

2,110,699

UNITED STATES PATENT OFFICE 2,110,699

PRODUCTION OF DIACETYL

Ernst Eberhardt and Friedrich Lieseberg, Ludwigshafen-on-the-Rhine, Germany, assignors to I. G. Farbenindustrie Aktiengesellschaft, Frankfort-on-the-Main, Germany No Drawing. Application August 31, 1936, Serial No. 98,724. In Germany September 6, 1935

2 Claims. (Cl. 260—134)

The present invention relates to an improved method for producing diacetyl.

In the U. S. Patent 2,062,263 one of the present inventors has described and claimed a process for producing diacetyl according to which aqueous solutions of mercuric salts are caused to act on divinyl or vinylacetylene or gases containing these compounds in the presence of an oxygen-containing strong inorganic acid in the ratio of one molecular proportion of the said vinyl compound to at least 4 molecular proportions of HgO, heating the white precipitate of the mercuric addition compound obtained at a temperature of between 70 and 100° C. until it has become yellow and working up the reaction product while acid. In the said process there may be employed not only vinylacetylene and diacetylene but also gases which have been obtained from electric arc acetylene by strong cooling which gases mainly consist of vinylacetylene and diacetylene. The recovery of the vinylacetylene and the diacetylene is rendered difficult, however, by the strong dilution of the electric arc gas which contains only about 1 per cent of vinylacetylene and diacetylene, and it necessitates voluminous separation and purification apparatus.

We have now found that it is not necessary first to separate the vinylacetylene and diacetylene from the electric arc gas or to carry out an enrichment of these substances by strong cooling before converting them into diacetyl. On the contrary it is possible with advantage to carry out a simultaneous conversion of the vinylacetylene and diacetylene into diacetyl on the one hand and of the acetylene contained in the electric arc gas into acetaldehyde on the other hand with the aid of a catalytic solution containing a strong oxygen containing inorganic acid and a mercury salt and to recover the diacetyl and acetaldehyde separately from the resulting reaction mixture. Sulfuric acid and phosphoric acid may, for example, be employed as strong oxygen containing inorganic acid. The mercury should be present in an amount of from about 3 up to about 20 grams per liter, corresponding, for example, to about 4.5 up to about 30 grams of mercuric sulfate. The reaction may be carried out with any catalytic liquid containing mercury. The catalytic liquid may also contain iron salts in known manner in addition to the mercury salts. The reaction temperature may be varied between 70 and 100° C., a temperature between 90° and 100° C. being preferably employed. At this temperature during the course of the reaction the addition compound intermediately formed by the action of the mercuric salt on the vinylacetylene and/or diacetylene is decomposed thus rendering free the diacetyl produced which escapes from the reaction vessel together with the acetaldehyde formed. In order to obtain good yields both of diacetyl and acetaldehyde the speed of the gas mixture should not be too high. Generally speaking a rate of flow exceeding 1 cubic meter of gas per 10 litres of catalytic solution should not be employed.

The process according to this invention offers the advantage that on the one hand a special separation and purification apparatus for the initial gas is unnecessary, whereas on the other hand the separation of the final products, i. e. the acetaldehyde and diacetyl, can be effected in a very simple manner. This latter separation may be effected for example by leading the gases coming from the catalytic liquid through a condenser, as for example a water cooler. A condensate is thus obtained which contains the diacetyl and also considerable amounts of acetaldehyde. Besides, small amounts of methyl vinyl ketone may be present in the reaction product which ketone is primarily formed by the addition of water to the vinylacetylene present in the gas mixture employed. The remainder of the acetaldehyde is recovered in a further condenser at a lower temperature. By fractional condensation, however, an aqueous condensate in which the diacetyl is contained but which is free to a far-reaching extent from acetaldehyde may be directly obtained. From the aqueous condensate, after distilling off any acetaldehyde contained therein, the diacetyl may be obtained; it passes over as a yellow oil containing water at a temperature of 75° C.

It could not be foreseen that with the great dilution in which the vinyl acetylene and diacetylene are present in the unpurified electric arc gas it would be possible to effect the preparation of diacetyl in such a simple and economical manner.

The following example will further illustrate how the said invention may be carried out in practice but the invention is not restricted to this example.

Example

A gas obtained by the treatment of propane in the electric arc, which contains in addition to hydrogen mainly about 1.5 per cent of diacetylene and vinylacetylene, about 19 per cent of acetylene and about 0.7 per cent of other unsaturated compounds, is led at a speed of 14 cubic metres per hour at from 90° to 95° C. through 150 litres of an aqueous solution containing per liter 35 grams of iron in the form of ferric sulphate and 8 grams of mercury (corresponding to 12 grams of mercuric sulphate) and which contains about 6 per cent of free sulfuric acid. The acetylene is thus converted into acetaldehyde while the vinylacetylene and diacetylene are converted into diacetyl.

The gas mixture escaping from the reaction liquid is led through a water condenser in which the major portion of the water vapour is condensed with the diacetyl and a part of the acetaldehyde. The residual gas is led through a second washing tower in which the remainder of the acetaldehyde is recovered. The aqueous condensate obtained in the first condenser is separated into acetaldehyde, diacetyl and water in a distilling column. From each 14 cubic metres of electric arc gas there are obtained about 6 litres of condensate from which there are obtained about 200 cubic centimetres of crude diacetyl which may be purified in a suitable manner, as for example by further distillation, by way of the sodium bisulphite compound of diacetyl, over the dimethyl glyoxime nickel or by freezing.

What we claim is:

1. A process of producing diacetyl which comprises leading a dilute acetylene gas mixture obtained by treating hydrocarbons in the electric arc and containing vinylacetylene and diacetylene through a catalytic solution containing a strong oxygen-containing inorganic acid and the mercury salt of this acid in an amount corresponding to from about 3 up to about 20 grams of mercury per liter of the catalytic solution at a temperature of between 70° and 100° C., cooling the gas mixture escaping from the said catalytic solution and recovering from the condensate by redistillation the diacetyl formed.

2. A process of producing diacetyl which comprises leading a dilute acetylene gas mixture obtained by treating hydrocarbons in the electric arc and containing vinylacetylene and diacetylene through a catalytic solution containing a strong oxygen-containing inorganic acid and the mercury salt of this acid in an amount corresponding to from about 3 up to about 20 grams of mercury per liter of the catalytic solution at a temperature of between 70° and 100° C., cooling the gas mixture escaping from the said catalytic solution in a first condenser, distilling off from the condensate any acetaldehyde present, recovering from the aqueous remainder the diacetyl formed, and condensing in a second condenser the remainder of the acetaldehyde.

ERNST EBERHARDT.
FRIEDRICH LIESEBERG.